United States Patent [19]

Grumlose et al.

[11] Patent Number: 5,481,690
[45] Date of Patent: Jan. 2, 1996

[54] POWER-EFFICIENT EXTERNAL MEMORY ACCESS CONTROL USING EXTERNAL MEMORY ENABLE TIME DURATIONS INDEPENDENT OF EXTERNAL MEMORY ACCESSING RATE

[75] Inventors: Dean Grumlose; Dale Gulick, both of Austin, Tex.

[73] Assignee: Advanced Micro Devices, Inc., Austin, Tex.

[21] Appl. No.: 140,820

[22] Filed: Oct. 4, 1993

Related U.S. Application Data

[63] Continuation of Ser. No. 569,935, Aug. 20, 1990, abandoned.

[51] Int. Cl.$^6$ .................................................. G06F 13/42
[52] U.S. Cl. .............. 395/494; 395/182.07; 364/DIG. 1; 364/270.2; 364/934.3
[58] Field of Search ............................ 364/200 MS File, 364/900 MS File; 395/400 MS, 425 MS

[56] References Cited

U.S. PATENT DOCUMENTS

| | | | |
|---|---|---|---|
| 3,919,695 | 11/1975 | Gooding | 395/550 |
| 4,379,265 | 4/1983 | Catiller | 395/550 |
| 4,507,732 | 3/1985 | Catiller et al. | 364/200 |
| 4,532,587 | 7/1985 | Roskell et al. | 364/200 |
| 4,615,005 | 9/1986 | Maejima et al. | 359/550 |
| 4,617,624 | 10/1986 | Goodman | 364/200 |
| 4,631,659 | 12/1986 | Hayn, II et al. | 395/325 |
| 4,685,087 | 8/1987 | Shah | 365/227 |
| 4,805,137 | 2/1989 | Grant et al. | 395/325 |
| 4,835,728 | 5/1989 | Si et al. | 395/550 |
| 4,845,632 | 7/1989 | Kroll et al. | 395/750 |
| 4,884,234 | 11/1989 | Keys et al. | 364/900 |
| 4,908,748 | 3/1990 | Pathak et al. | 395/400 |
| 5,125,088 | 6/1992 | Culley | 395/500 |
| 5,142,684 | 8/1992 | Perry et al. | 395/550 |
| 5,155,812 | 10/1992 | Ehlig et al. | 395/425 |
| 5,301,306 | 4/1994 | Plog | 395/550 |

FOREIGN PATENT DOCUMENTS 57-034245  2/1982  Japan .

OTHER PUBLICATIONS

Memory Controller Which Automatically Adjusts to Changes In system Clock Rate, *IBM Technical Disclosure Bulletin*, 32:265–266 (1990).

Primary Examiner—Reba I. Elmore
Attorney, Agent, or Firm—Foley & Lardner

[57] ABSTRACT

A processing system having a processor which accesses external memory for data and/or instructions includes an improved external memory access control system producing external memory enable time durations which are independent of the number of external memory accesses per unit of time, thereby reducing power consumption of the processing system. The control system includes a clock source for providing a clock signal which determines the external memory access rate. An enable duration control is coupled to the clock source and is arranged to enable the external memory for time durations during each memory access which are independent from the external memory access rate.

24 Claims, 3 Drawing Sheets

POWER-EFFICIENT EXTERNAL MEMORY ACCESS CONTROL USING EXTERNAL MEMORY ENABLE TIME DURATIONS INDEPENDENT OF EXTERNAL MEMORY ACCESSING RATE

This is a continuation of application Ser. No. 07/569,935 filed Aug. 20, 1990, now abandoned.

BACKGROUND OF THE INVENTION

The present invention generally relates to processing systems and more particularly to processing systems wherein external memory accessing is required. The present invention still more particularly relates to an improved external memory access control for a processing system which reduces power consumption of the processing system by establishing external memory enable time durations which are independent from the external memory accessing rate.

Processing systems which include at least one microprocessor are well known in the art. In such processing systems, the microprocessor is generally required to access external memory for data and/or instructions. It is also common for microprocessor-based processing systems to have periods of high activity, wherein a large number of operations are performed per unit of time, interspersed with periods of low activity, wherein relatively few operations are performed per unit of time.

To reduce the power consumption of such processing systems during periods of low activity, it has been common in the prior art to reduce the external memory access rate of the microprocessor. This is typically accomplished through the use of either a variable-rate oscillator clock source or by incorporating into the microprocessor a clock divider circuit to reduce the external memory access rate. Since the microprocessor communicates with external memory through a bus, the external memory access rate may also be referred to as a bus access rate.

The foregoing prior art methods of reducing power consumption during low activity periods by reducing the external memory access rate has been generally effective with digital CMOS (Complementary Metal-Oxide-Semiconductor) logic systems because the power consumption of digital CMOS logic systems is roughly proportional to the number of signal transitions occurring per unit of time. This results because digital CMOS logic consumes the majority of its power when its internal and input signals are changing and consumes very little power when its internal signals are not changing.

Unfortunately, standard commercially available memory devices such as random access memory (RAM) devices and electrically programmable read only memory (EPROM) devices differ from digital CMOS logic in that these devices consume power whenever their enable inputs are held in the active state. The power consumption of such devices is therefore dependent upon the amount of time the memories are enabled (the amount of time the CHIP ENABLE signal is held active) in addition to the memory access rate (the frequency of transitions of the CHIP ENABLE signal). Although it is technically possible to provide RAM and EPROM devices which would consume power only when internal and external signals are in transition, these devices would be more complex and would not benefit from the economies of scale which result from providing one design for all applications.

In existing micro-processor based processing systems, the CHIP ENABLE signal for external RAM and/or EPROM is decoded either within the microprocessor or by logic external to the microprocessor from bus control signals provided by the microprocessor. Typical bus control signals, as for example with respect to the 8031 class of microcontroller include the address lines, ALE, PSEN*, RD,, and WR*. The names and functions of the bus control signals differ from one microprocessor/ microcontroller to another, but the fundamental concept of providing enabling and directional information to devices external to the microprocessor remains the same.

The limitation in the prior art with respect to low-power processing system operation is that when the memory access rate of existing microprocessors and controllers is reduced in an attempt to save system power, the width of the bus control signals provided by the microprocessor (the external memory enable time durations) varies in direct proportion to the bus rate (external memory access rate) of the processor. As a result, even though the external memory access rate of the processor is reduced, the external memory enable time durations proportionately increase. Hence, the slower the memory access rate becomes, the longer the external memory enable time durations become. This is wasteful of system power since the external memory devices are enabled for a much longer time duration then is required to complete the accessing of the external memory devices.

Hence, there is a need in that art for a processing system which includes a processor which reduces the power consumption of standard commercially available memory devices which are not specifically designed for very low power operation, The present invention provides such a processing system by providing a new and improved external memory access control system which renders the external memory enable time durations independent from the number of external memory accesses per unit of time.

SUMMARY OF THE INVENTION

The present invention provides an improved external memory access control system for use in a processing system of the type having a processor which accesses external memory for data and/or instructions wherein the improved external memory access control system renders the external memory enable time durations independent from the number of external memory accesses per unit of time for reducing power consumption of the processor. The improved external memory access control system includes clock means for providing a clock signal for determining the number of external memory accesses per unit of time and enable duration control means coupled to the clock means and being arranged to provide the external memory with external memory enable time duration control signals for establishing external memory enable time durations which are independent from the number of external memory accesses per unit of time.

The invention further provides a memory access control system for controlling the memory enable times of a memory independently from the memory access rate. The memory access control system includes clock means for providing memory access rates including a maximum rate and a slow rate and memory enable duration control means having an input coupled to the clock means and an output coupled to the memory for providing the memory with enable signals having a fixed duration corresponding to the maximum access rate regardless of the memory access rate provided by the clock means.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements and wherein:

DETAILED DESCRIPTION OF THE PREFERRED EMBODIMENTS

Figure 1:
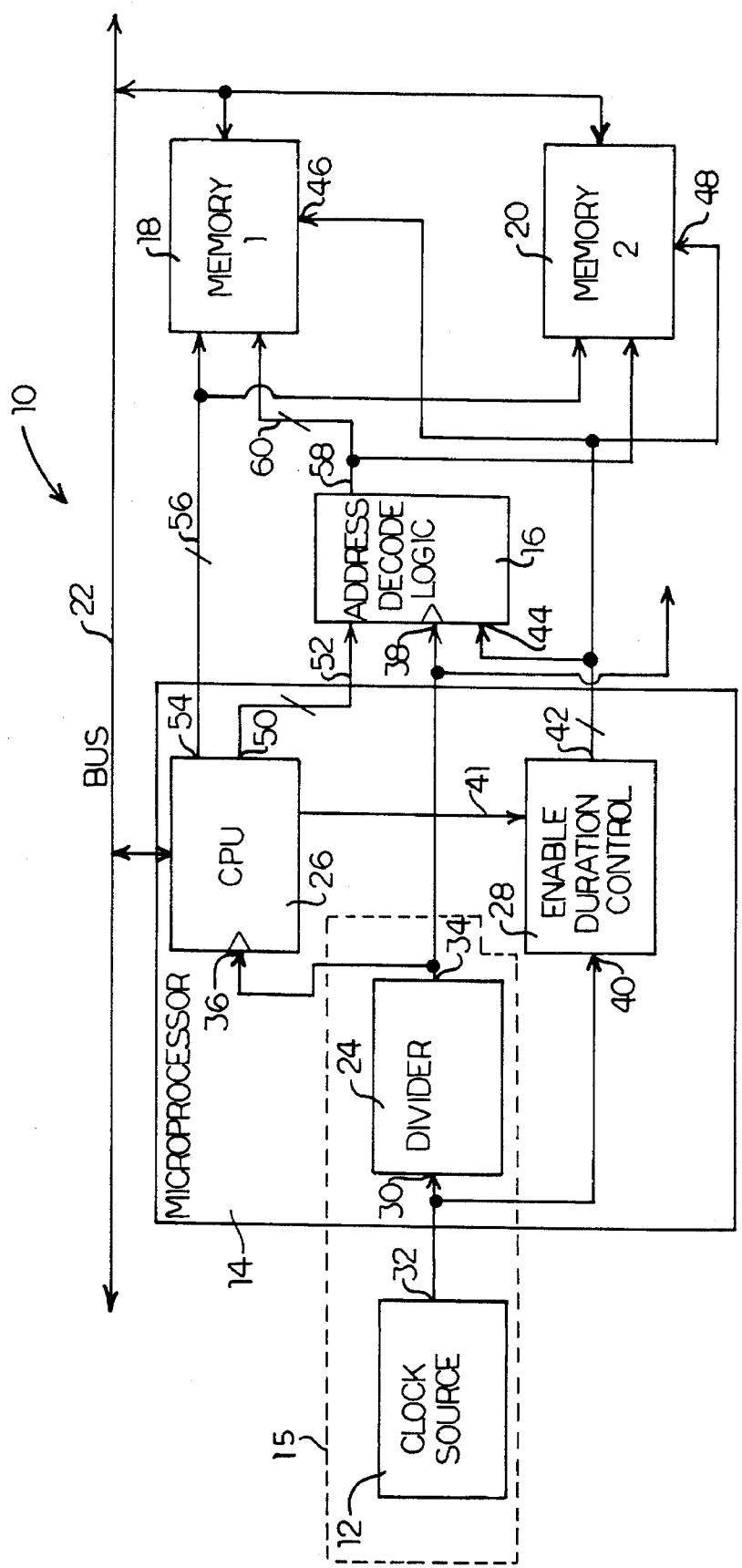
FIG. 1 is a block diagram of a processing system embodying the present invention.

Referring now to FIG. 1, it illustrates, in block diagram form, a processing system 10 embodying the present invention. The processing system 10 generally includes a clock source 12, a microprocessor 14, address decode logic 16, a first memory 18, a second memory 20, and a bus 22. In accordance with this preferred embodiment, the clock source 12, address decode logic 16, the first memory 18, and the second memory 20, are all external to the microprocessor 14. Also, the clock source 12, the microprocessor 14, address decode logic 16, the first memory 18 and the second memory 20 may all be implemented in integrated circuit form with each being contained within separate integrated circuit devices.

The microprocessor 14 includes a divider circuit 24, a central processing unit 26, and an enable duration control 28, in accordance with the present invention. The divider circuit 24 has an input 30 coupled to the output 32 of the clock source 12 for receiving the clock output of the clock source 12. The divider 24 also has an output 34 which is coupled to a clock input 36 of the central processing unit 26 and a clock input 38 of the address decode logic. The clock source 12 provides a clock output comprising a relatively high frequency pulse train which is divided by the divider circuit 24 to provide at its output 34 timing and synchronizing clock signals for the processing system. Together, clock source 12 and divider 24 form clock means 15 which provides a clock signal for determining the number of external memory accesses per unit of time. As will be seen hereinafter, the output frequency of the clock signal provided by the divider 24 at its output 34 determines the external memory access rate by the microprocessor 14.

The enable duration control 28 includes an input 40 which is coupled between the output 32 of the clock source 12 and the input 30 of the divider circuit 24. In accordance with the present invention, the enable duration control provides at its output 42 external memory enable time duration signals which determine the time in which the external memories are enabled for utilizing the bus during each access of the external memories by the microprocessor 14. As will also be seen hereinafter, the enable time durations established by the enable duration control 28 are independent from the external memory access rate determined by the divider 24. The enable duration control 28 also includes an input 41 coupled to the central processing unit 26. This input allows the central processing unit 26 to control when the enable time durations established by the enable duration control begin, but synchronized to the clock source output.

The output 42 of the enable duration control 28 comprises a plurality of lines denoted by the hash mark, which lines are coupled to bus enable control inputs 44 of the address decode logic 16, the bus enable inputs 46 of the first external memory 18, and the bus enable inputs 48 of the second external memory 20. As will be appreciated by those skilled in the art, the output 42 of the enable duration control 28 may be coupled to the address decode logic and external memories as illustrated in FIG. 1, may be coupled directly and only to the external memories 18 and 20, or may be coupled to the external memories 18 and 20 only through the address decode logic depending upon the particular processing system design and without departing from the present invention.

The central processing unit 26 includes a first output 50 for providing a first set of external memory addresses to the address decode logic 16 over a first plurality of lines 52. The central processing unit 26 also includes a second output 54 for providing a second set of external memory addresses to the external memories 18 and 20 over a second plurality of output lines 56. When the microprocessor 14 accesses an external memory, the first set of addresses are decoded by the address decode logic for the purpose of selecting the external memory to be accessed. To that end, the address decode logic includes an output 58 which is coupled to the first and second memories 18 and 20 over a plurality of output lines 60 for conveying to the external memories 18 and 20 external memory or chip select signals.

The second set of addresses provided by the central processing unit 26 are utilized for selecting the desired memory location within the external memory to be accessed. Each of the memories 18 and 20 preferably includes a plurality of memory locations with each memory location having a unique address with respect to its memory. The memory address locations of the external memories may have duplicated addresses. Hence, the chip select signals provided by the address decode logic 16 over lines 60 select the memory to be accessed and the second set of memory addresses conveyed over lines 56 select the particular memory location to be accessed within the selected external memory to be accessed.

As will also be noted in FIG. 1, the central processing unit 26 is coupled to the bus 22 and the external memories 18 and 20 are also coupled to the bus 22. The central processing unit 26 and external memories 18 and 20 are coupled to the bus 22 to enable the microprocessor 14 to communicate with the external memories to permit the central processing unit to read data and/or instructions from the external memories or to write data into the external memories during external memory accesses.

In operation, as the central processing unit 26 of the microprocessor 14 performs executions of instructions, the central processing unit must access the external memories 18 and 20 to read data or instructions from the external memories or write data to the external memories. The clock source 12 provides at its output 32 a clock output in the form of a relatively high frequency pulse train from which the external memory access rate is derived. The external memory access rate is derived from the output 34 of the divider 24. In accordance with this preferred embodiment, the frequency of the clock source defines the maximum access rate of the external memories by the microprocessor. During times of high microprocessor activity, the divider 24 will divide the clock rate of the clock output provided by the clock source 12 by a factor of one. During periods of low microprocessor activity, the access rate is reduced to conserve power and the divider will then divide the clock rate of the clock output provided by the clock source 12 by a factor of thirty-two, for example, in accordance with this preferred embodiment.

The clock signal provided at the output 34 of the divider 24 thus determines the external memory access rate of the microprocessor and is also used for other timing and synchronizing purposes within the processing system 10. The enable duration control 28 establishes the time duration in which the external memories are enabled during each external memory access and is also responsive to the central processing unit 26 for beginning the memory enable time durations at the proper time.

Figure 3A:
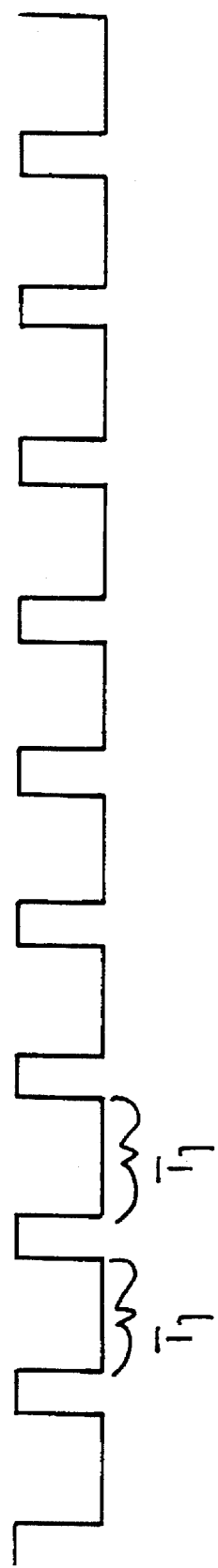
FIG. 3a is a waveform illustrating the external memory enable time duration control signals provided in the processing systems of FIGS. 1 and 2 for a high external memory access rate.

FIG. 3a represents the enable duration control signal provided to the external memories 18 and 20 during periods of high microprocessor activity. As previously mentioned, the enable control signal is applied to the bus enable inputs 46 and 48 of the external memories 18 and 20 respectively. During the time periods $T_1$, when the enable control signal is at a low level, the external memory bus enable inputs 46 and 48 are rendered active to turn on the external memories 18 and 20 respectively. Because the enable duration control is coupled between the clock source 12 and the divider 24, enable time durations correspond to the maximum external memory rate of the microprocessor 14.

At the beginning of each external memory access, the central processing unit 26 generates the first and second sets of external memory addresses at outputs 50 and 54 respectively, the first set of external memory addresses being decoded by the address decode logic 16 for selecting the particular external memory to be accessed, and the second set of external memory addresses being applied directly to the external memories 18 and 20 for selecting the particular memory location to be accessed in the external memory to be accessed. When the external memory select signals, the memory location address signals, and the enable duration control signals are applied to the external memories 18 and 20, the particular external memory 18 or 20 being accessed is then turned on and enabled to use the bus. If the accessed memory is to provide data or an instruction to the central processing unit 26, the enable duration control 28 will apply a read enable duration control signal to the bus enable inputs 46 and 48 of external memories 18 and 20. As previously explained, the enable duration control signal, in accordance with this preferred embodiment, is also applied to the address decode logic but, without departing from the present invention, could be applied to the external memories only through the address decode logic, or be applied directly to the external memories without being applied to the address decode logic. If the accessed external memory is to receive data from the central processing unit 26, the enable duration control 28 will apply a write enable duration control signal to the bus enable inputs 46 and 48 of the external memories 18 and 20 respectively. In either case, the read or write enable duration control signal will take the form of the waveform illustrated in FIG. 3a. As long as the enable duration control signal is at a low level during time periods $T_1$, the accessed external memory will be turned on and enabled.

Figure 3B:
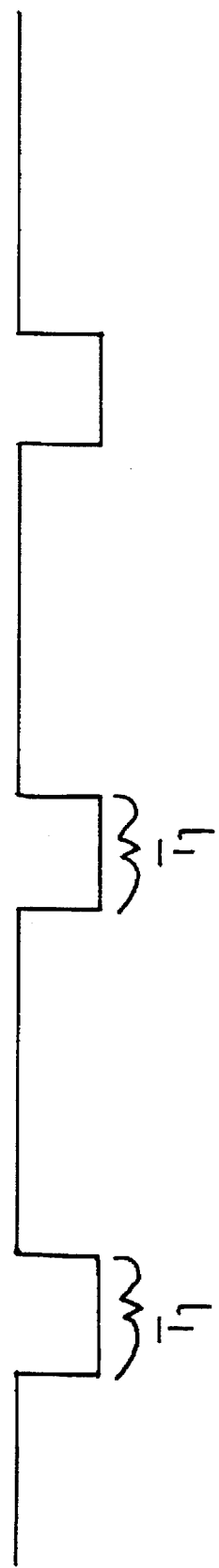
FIG. 3b is a representative waveform of an external memory enable time duration control signal provided in the processing systems of FIGS. 1 and 2 for a low external memory access rate.

FIG. 3b represents the enable duration control signal for periods of low microprocessor activity. During such periods, the external memories need not be accessed at the maximum rate and, in order to conserve power, the external memory access rate is shown in FIG. 3b for illustrative purposes only to be reduced by a factor of ⅓, although in actual practice, as previously described, an access rate reduction of ⅟₃₂ would be preferable. The external memory access rate is determined by the divider 24 dividing the clock output of the clock source 12 by a factor of 3.

In prior art processors, the enable time durations of the external memories are based upon the external memory access rate and hence, upon the output of the divider 24. As a result, the external enable time durations are proportional to the dividing factor of the divider. Hence, in prior art processing systems, the external memory enable time durations during each external memory access at the slower rate will be three times as long as the external memory enable time durations during each external memory access at the maximum rate. This represents a waste of power since the shorter external memory enable time duration corresponding to the maximum external memory access rate is adequate for the complete information transfer between the central processing unit and the external memories and thus, completion of an external memory access.

In contrast to prior art processing systems, since the enable duration control 28 is coupled between the clock source 12 and the divider 24, it establishes the external memory enable time durations independently from the external memory access rates. As can be seen in FIG. 3b, although the external memory access rate is reduced by a factor of three, the external memory enable time durations remain the same for each memory access for the time period of $T_1$ which corresponds to the external memory enable time duration for the maximum external memory access rate.

Hence, the enable duration control 28, in accordance with the present invention, establishes external memory enable time durations for each memory access which remain the same regardless of the external memory access rate. As a result, power is not wasted by allowing the external memories to be on longer than necessary during each memory access while also allowing the external memory access rate to be reduced during periods of low microprocessor activity.

The enable time duration control 28 may be implemented through the use of logic circuits of the type well known in the art which can establish a fixed external memory address time duration based upon the clock source output or may be, for example, a one-shot multivibrator. The provision of such circuits is well known in the art and need not be described in detail herein.

Figure 2:
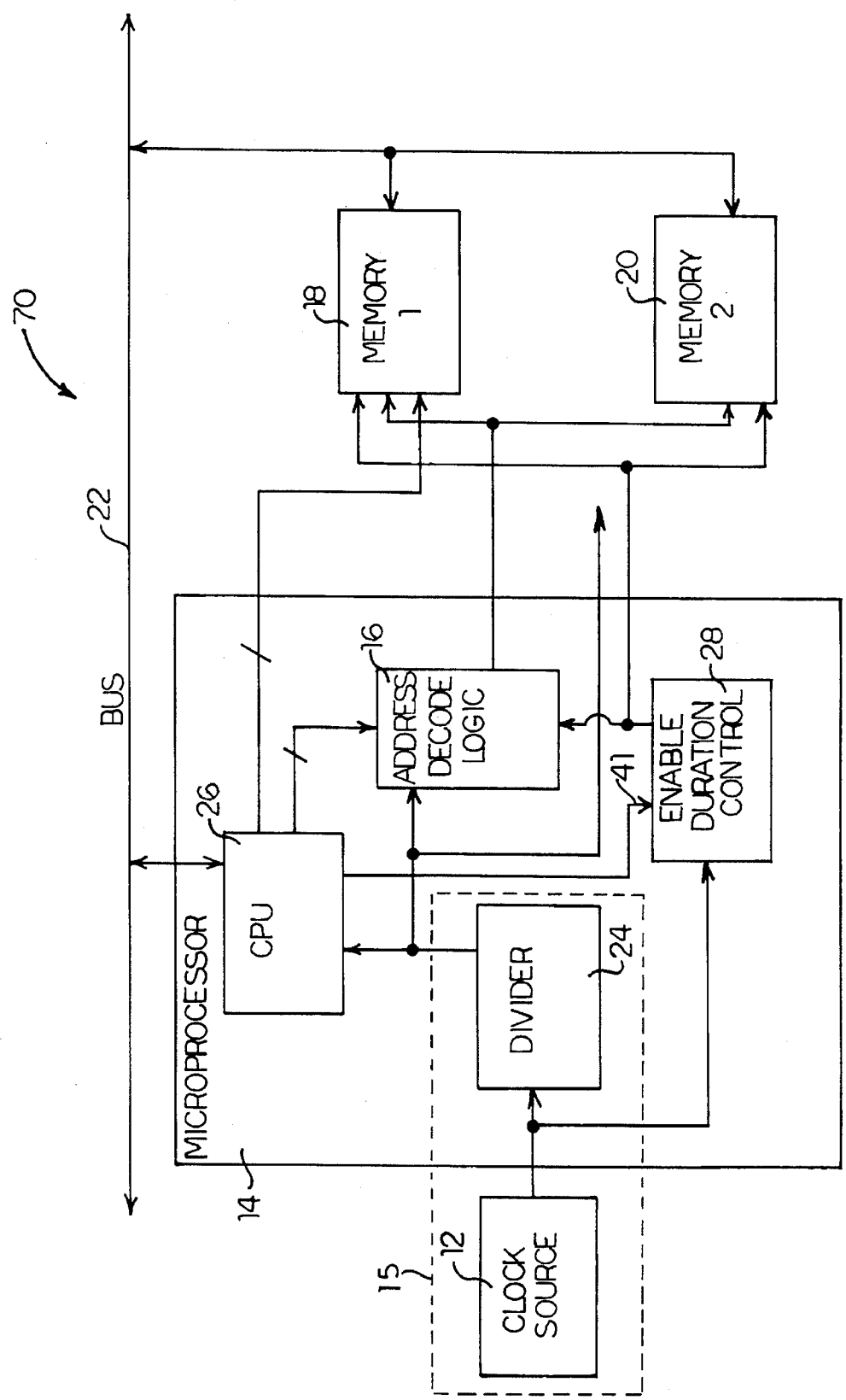
FIG. 2 is a block diagram of another processing system embodying the present invention.

Referring now to FIG. 2, it illustrates another processing system 70 embodying the present invention. The processing system 70 is essentially identical to the processing system 10 of FIG. 1 except that the address decode logic 16 is contained within the microprocessor and is thus integrated with the microprocessor on the same integrated circuit chip. Hence, the microprocessor 14 of the processing system 70 provides the external memory select signals directly for direct connection to the external memories 18 and 20 without the need for an external address decode logic for decoding the first set of external memory addresses into external memory select signals. In all other respects, the processing system 70 functions in the same manner as the processing system 10 previously described.

The present invention therefore provides a new and improved external memory access control for use in a processing system which not only enables the external memory access rates to be reduced during periods of low microprocessor activity to thus reduce power consumption of the processing system, but in addition, also shortens the external memory enable time durations during each memory access during those periods when the external memory access rate is reduced. This further contributes to reduce the power consumption of the processing system which may be exceedingly important when such processing systems are powered by depletable power sources such as battery power sources. Preferably, and in accordance with the preferred embodiments described herein, the external memory enable time durations are remained constant, corresponding to the enable time durations for the maximum external memory access rate, regardless of the external memory access rate of the microprocessor.

While particular embodiments of the present invention have been shown and described, modifications may be made, and it is therefore intended to cover in the appended claims all such changes and modifications which fall within the true spirit and scope of the invention.

What is claimed is:

1. In a processing system having a processor which accesses external memory for data and/or instructions at a plurality of external memory access rates including a maximum rate and a slow rate, said processor having a clock input and being responsive to a clock signal received at said clock input, an improved external memory access control system for reducing power consumption of said system by selectively accessing said memory at said slow rate, said control system comprising: clock means for providing a substantially constant-rate clock signal and coupled to said clock input for providing a variable-rate clock signal to said processor for establishing said slow rate; and enable duration control means coupled to said clock means for receiving said substantially constant-rate clock signal, said enable duration control means providing said external memory with external memory enable time duration control signals in response to said substantially constant-rate clock signal for establishing external memory enable time durations which are independent from said plurality of external memory access rates.

2. A control system as defined in claim 1 wherein said clock means includes a clock source having an output for providing a clock output and a divider having an input coupled to said clock source output and an output for providing said clock signal and wherein said enable duration control means has an input coupled between said clock source and said divider, said clock output being provided to said divider and said enable duration control means.

3. A control system as defined in claim 2 wherein said output of said divider is arranged to provide said external memory access rates including said maximum rate and said slow rate and wherein said enable duration control means is arranged to provide the same enable time duration for both said rates.

4. A control system as defined in claim 3 wherein said maximum rate is on the order of thirty-two times greater than said slow rate.

5. A control system as defined in claim 1 wherein said processing system comprises a plurality of external memories, wherein said processor includes a central processing unit for generating a first set of external memory addresses, and wherein said control system further comprises address decode logic means, coupled to said central processing unit and to said external memories for providing memory select signals to said external memories responsive to said first set of external memory addresses for selecting the memories to be accessed.

6. A control system as defined in claim 5 wherein said central processing unit further generates a second set of external memory addresses and is coupled to each of said external memories for conveying said second set of external memory addresses to said external memories.

7. A control system as defined in claim 6 wherein each of said external memories includes a plurality of memory locations, each said location having a unique address with respect to its external memory, wherein said memory select signals select the external memory to be accessed and wherein said second set of external memory addresses select the memory location to be accessed within said external memory to be accessed.

8. A control system as defined in claim 5 wherein said address decode logic means is external to said processor.

9. A control system as defined in claim 5 wherein said address decode logic means is within said processor.

10. A control system as defined in claim 5 wherein said clock means includes a clock source and a divider, said clock source being coupled to said divider, said divider having an output for providing said clock signal and wherein said enable duration control means includes an input coupled between said clock source and said divider.

11. A control system as defined in claim 10 wherein said clock source is external to said processor.

12. A control system as defined in claim 11 wherein said divider is within said processor.

13. A control system as defined in claim 12 wherein said enable duration control means is within said processor.

14. A control system as defined in claim 5 wherein said processing system includes a bus coupled between said central processing unit and said external memories for conveying said data or instructions between said central processing unit and said external memories during said memory accesses.

15. A control system as defined in claim 14 wherein said enable duration control means include an output coupled to said external memories for providing said external memories with said external memory enable time duration control signals for enabling said memories to utilize said bus during said enable time durations.

16. A control system as defined in claim 15 wherein said enable duration control means output is coupled directly to said external memories.

17. A control system as defined in claim 15 wherein said enable duration control means output is coupled to said external memories through said address decode logic means.

18. A memory access control system for controlling memory enable times of a memory independently from memory access rate, said memory access control system comprising:

clock means for providing a variable-rate clock signal for establishing memory access rates including a maximum rate and a slow rate and a substantially constant-rate clock signal; and memory enable duration control means having an input coupled to said clock means and an output coupled to said memory and responsive to said substantially constant-rate clock signal for providing said memory with enable signals having a fixed duration corresponding to said maximum rate regardless of the memory access rate provided by said clock means.

19. A memory access control system as defined in claim 19 wherein said clock means comprises a clock source for providing clock signals for establishing said maximum rate and a divider coupled to said clock source for dividing said clock signals for providing said slow rate, and wherein said memory enable duration control means has an input coupled between said clock source and said divider.

20. A processing system comprising:

clock means for providing a substantially constant-rate clock signal and a variable-rate clock signal;

a memory having a bus enable input, an address input and an output, the memory providing data and/or instructions at said output in response to an address signal received at said address input and a bus enable signal received at said bus enable input;

a processor coupled to the memory, the processor providing an address to said memory address input to access said memory for said data and/or instructions, said processor having a clock input coupled to said clock means for receiving said variable-rate clock signal, the processor being responsive to said variable-rate clock signal for providing said address, said variable-rate clock signal establishing an external memory access rate; and enable duration control means having an input coupled to said clock means and an output coupled to the bus enable input, the enable duration control means providing a bus enable signal to said bus enable input in response to said substantially constant-rate clock signal, said bus enable signal having a substantially constant external memory enable time duration, the external memory enable time duration being independent of said external memory access rate.

21. A processing system as defined in claim 20 wherein said clock means includes a clock source having an output for providing said substantially constant-rate clock signal and a divider having an input coupled to said clock source output and an output for providing said variable-rate clock signal and wherein said enable duration control means input is coupled to said clock source output.

22. A processing system as defined in claim 20 wherein said memory comprises a plurality of external memory devices, each respective external memory device having a respective bus enable input and a respective address input, and wherein said processor includes a central processing unit for generating a first set of external memory addresses, and wherein said processing system further comprises address decode logic means coupled to said central processing unit and to said plurality of external memory devices for providing memory select signals to one said respective address input respective to said first set of external memory addresses.

23. A processing system as defined in claim 22 wherein each external memory device has a respective output and wherein said processing system includes a bus coupled between said central processing unit and each said respective output for conveying said data and/or instructions between said central processing unit and said plurality of external memory devices.

24. A processing system as defined in claim 23 wherein said each respective external memory device utilizes said bus during said external memory enable time duration in response to said bus enable signal.

* * * * *